US012610298B2

(12) United States Patent
Wang

(10) Patent No.: US 12,610,298 B2
(45) Date of Patent: Apr. 21, 2026

(54) METHOD, DEVICE AND COMPUTER STORAGE MEDIUM OF COMMUNICATION DURING A SWITCH AMONG COMMUNICATION NETWORKS

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 479 days.

(21) Appl. No.: 17/908,805

(22) PCT Filed: Mar. 2, 2020

(86) PCT No.: PCT/CN2020/077468
§ 371 (c)(1),
(2) Date: Sep. 1, 2022

(87) PCT Pub. No.: WO2021/174388
PCT Pub. Date: Sep. 10, 2021

(65) Prior Publication Data
US 2023/0345332 A1     Oct. 26, 2023

(51) Int. Cl.
*H04W 36/14*          (2009.01)
(52) U.S. Cl.
CPC ................................. *H04W 36/144* (2023.05)
(58) Field of Classification Search
None
See application file for complete search history.

(56) References Cited

U.S. PATENT DOCUMENTS 10,623,946 B1 * 4/2020 Kumar ................... H04W 76/16
11,470,524 B2 * 10/2022 Vaidya .............. H04W 36/0058
(Continued)

FOREIGN PATENT DOCUMENTS

CN        110495208 A      11/2019
JP        H10-023517 A      1/1998
(Continued)

OTHER PUBLICATIONS

"3rd Generation Partnership Project: Technical Specification Group Services and System Aspects: Study on Support for Multi-USIM Devices (Release 17)" 3GPP TR 22.834 VI, 0.0, May 31, 2019, 17 pages.
(Continued)

*Primary Examiner* — German Viana Di Prisco
(74) *Attorney, Agent, or Firm* — Sughrue Mion, PLLC

(57) ABSTRACT

Embodiments of the present disclosure relate to methods, devices and computer readable media for communication. A method of communication comprises determining, at a terminal device, whether a switch is to be performed from a first network device of a first communication network to a second network device of a second communication network, the first and second communication networks being associated with first and second identities of the terminal device respectively; and in response to determining that the switch is to be performed, transmitting, to the first network device, a request for the switch from the first network device to the
(Continued)

second network device. In this way, the switch can be notified to the network side and network performance during the switch can be enhanced.

12 Claims, 8 Drawing Sheets

(56) References Cited

U.S. PATENT DOCUMENTS

| | | | |
|---|---|---|---|
| 2014/0177599 A1 | 6/2014 | Tao | |
| 2015/0282019 A1 | 10/2015 | Anand et al. | |
| 2018/0176834 A1* | 6/2018 | Wei | H04W 36/0066 |
| 2019/0239270 A1 | 8/2019 | Lee et al. | |
| 2020/0221289 A1* | 7/2020 | Lee | H04W 8/24 |
| 2021/0076230 A1* | 3/2021 | Chen | H04L 5/001 |
| 2022/0256328 A1* | 8/2022 | Xie | H04W 76/28 |
| 2023/0047213 A1* | 2/2023 | Chen | H04W 68/02 |
| 2023/0396984 A1* | 12/2023 | Shrivastava | H04W 76/27 |
| 2024/0188176 A1* | 6/2024 | Jung | H04W 60/005 |
| 2025/0031120 A1* | 1/2025 | Xiao | H04W 24/02 |

FOREIGN PATENT DOCUMENTS

| | | | |
|---|---|---|---|
| JP | 2014-504125 A | 2/2014 | |
| WO | 2014/000650 A1 | 1/2014 | |
| WO | 2018/023222 A1 | 2/2018 | |
| WO | 2018/227487 A1 | 12/2018 | |
| WO | 2019/100339 A1 | 5/2019 | |
| WO | 2019/126938 A1 | 7/2019 | |
| WO | 2019/134077 A1 | 7/2019 | |
| WO | 2020/014983 A1 | 1/2020 | |

OTHER PUBLICATIONS

International Search Report issued for PCT/CN2020/077468 dated Dec. 4, 2020.

Written Opinion issued for PCT/CN2020/077468 dated Dec. 4, 2020.

JP Office Action for JP Application No. 2022-552398, mailed on Sep. 5, 2023 with English Translation.

Huawei et al, "Solution for KI#3: RAN Based UE Initiated Release Request", 3GPP TSG SA WG2 #136AH S2-2000480, Jan. 7, 2020, pp. 1-pp. 3.

3GPP, Technical Specification Group Radio Access Network; Radio Resource Control (RRC); Protocol specification (Release 12), 3GPP TS 25.331 V12.5.0, 2015, pp. 1-pp. 167.

Huawei et al, "Discussion on dual registration and issues in LTE", 3GPP TSG RAN WG2 #103 R2-1812618, Aug. 10, 2018, pp. 1-pp. 4.

JP Office Action for JP Application No. 2022-552398, mailed on Feb. 6, 2024 with English Translation.

JP Official Communication for Japanese Patent Application No. 2022-552398, mailed on Jul. 2, 2024 with English Translation.

Office Action issued Jun. 27, 2023 in Chinese Application No. 202080097767.4.

Apple, "UE Assisted RRC State Transition", 3GPP TSG-RAN WG2 Meeting #106, R2-1907166, May 13-17, 2019, Reno, USA (3 pages).

CATT, "Remaining issues on UE RRC state transition request", 3GPP TSG-RAN WG2 Meeting #107bis, R2-1912110, Oct. 14-18, 2019, Chongqing, P. R. China (16 pages).

Huawei et al., "Key points on Dual SIM SID", 3GPP TSG RAN Meeting #86, RP-192792, Dec. 9-12, 2019, Sitges, Spain (2 pages).

* cited by examiner

300

310

WHETHER A SWITCH IS
TO BE PERFORMED FROM A FIRST NETWORK
DEVICE OF A FIRST COMMUNICATION NETWORK TO
A SECOND NETWORK DEVICE OF A SECOND
COMMUNICATION NETWORK ?

YES

320

TRANSMIT, TO THE FIRST NETWORK DEVICE, A
REQUEST FOR THE SWITCH FROM THE FIRST
NETWORK DEVICE TO THE SECOND NETWORK DEVICE

500

510

DETERMINE TDM PATTERN

520

PERFORM THE SWITCH ACCORDING TO THE TDM PATTERN

530

GENERATE FIRST INFORMATION OF THE TDM PATTERN FOR THE FIRST NETWORK DEVICE AND SECOND INFORMATION OF THE TDM PATTERN FOR THE SECOND NETWORK DEVICE

540

TRANSMIT THE FIRST INFORMATION TO THE FIRST NETWORK DEVICE

550

TRANSMIT THE SECOND INFORMATION TO THE SECOND NETWORK DEVICE

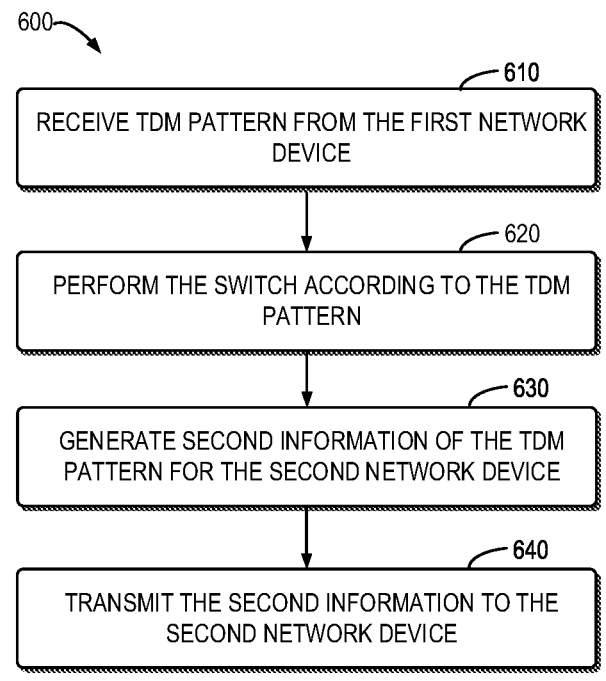

600

RECEIVE TDM PATTERN FROM THE FIRST NETWORK DEVICE ⌐610

PERFORM THE SWITCH ACCORDING TO THE TDM PATTERN ⌐620

GENERATE SECOND INFORMATION OF THE TDM PATTERN FOR THE SECOND NETWORK DEVICE ⌐630

TRANSMIT THE SECOND INFORMATION TO THE SECOND NETWORK DEVICE ⌐640

FIG. 6

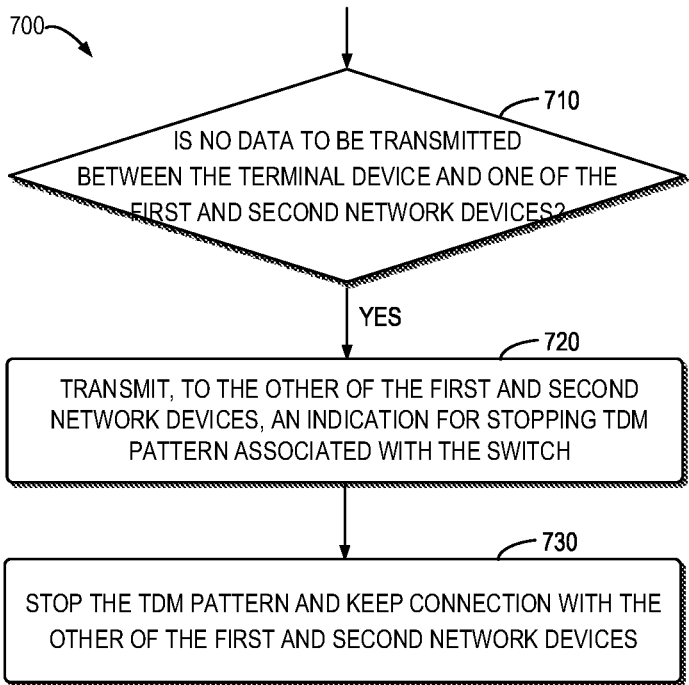

700

IS NO DATA TO BE TRANSMITTED BETWEEN THE TERMINAL DEVICE AND ONE OF THE FIRST AND SECOND NETWORK DEVICES? ⌐710

YES

TRANSMIT, TO THE OTHER OF THE FIRST AND SECOND NETWORK DEVICES, AN INDICATION FOR STOPPING TDM PATTERN ASSOCIATED WITH THE SWITCH ⌐720

STOP THE TDM PATTERN AND KEEP CONNECTION WITH THE OTHER OF THE FIRST AND SECOND NETWORK DEVICES ⌐730

RECEIVE, AT A FIRST NETWORK DEVICE OF A FIRST COMMUNICATION NETWORK AND FROM A TERMINAL DEVICE, A REQUEST FOR A SWITCH FROM THE FIRST NETWORK DEVICE TO A SECOND NETWORK DEVICE OF A SECOND COMMUNICATION NETWORK

900

910

DETERMINE TDM PATTERN ASSOCIATED WITH THE SWITCH

920

TRANSMIT THE TDM PATTERN TO THE TERMINAL DEVICE

METHOD, DEVICE AND COMPUTER STORAGE MEDIUM OF COMMUNICATION DURING A SWITCH AMONG COMMUNICATION NETWORKS

This application is a National Stage of International Application No. PCT/CN2020/077468 filed Mar. 2, 2020.

TECHNICAL FIELD

Embodiments of the present disclosure generally relate to the field of telecommunication, and in particular, to methods, devices and computer storage media of communication during a switch among communication networks.

BACKGROUND

Currently, a multi-universal subscriber identity module (USIM) terminal device occupies a large market share. Two USIM cards may conform to same or different communication standards such as long term evolution (LTE), new radio (NR) or the like, and the radio frequency (RF) capability of the terminal device may be 1 transmit port (Tx)/1 receive port (Rx), 1Tx/2Rx, 2Tx/2Rx or the like. However, no specification enhancement is made to improve the performance of the multi-USIM terminal device.

Assuming that a multi-USIM terminal device with single Tx registers to more than one network, e.g. a network (also referred to as a first network below) of USIM A and a network (also referred to as a second network below) of USIM B, and the terminal device has established a connection in the first network but stayed in idle or inactive state in the second network. Currently, when the terminal device needs to perform data transmission in the second network, the terminal device just releases the connection with the first network without notifying the first network. In this case, the first network would consider the terminal device as connection failure, which lead to incorrect network performance recording. Thus, the performance of the multi-USIM terminal device would not be assured.

SUMMARY

In general, embodiments of the present disclosure provide methods, devices and computer storage media for communication.

In a first aspect, there is provided a method of communication. The method comprises: determining, at a terminal device, whether a switch is to be performed from a first network device of a first communication network to a second network device of a second communication network, the first and second communication networks being associated with first and second identities of the terminal device respectively; and in response to determining that the switch is to be performed, transmitting, to the first network device, a request for the switch from the first network device to the second network device.

In a second aspect, there is provided a method of communication. The method comprises: receiving, at a first network device of a first communication network and from a terminal device, a request for a switch from the first network device to a second network device of a second communication network, the first and second communication networks being associated with first and second identities of the terminal device respectively.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 6 illustrates another example method of communication implemented at a terminal device in accordance with some embodiments of the present disclosure;

FIG. 7 illustrates another example method of communication implemented at a terminal device in accordance with some embodiments of the present disclosure;

Throughout the drawings, the same or similar reference numerals represent the same or similar element.

DETAILED DESCRIPTION

Figure 1:
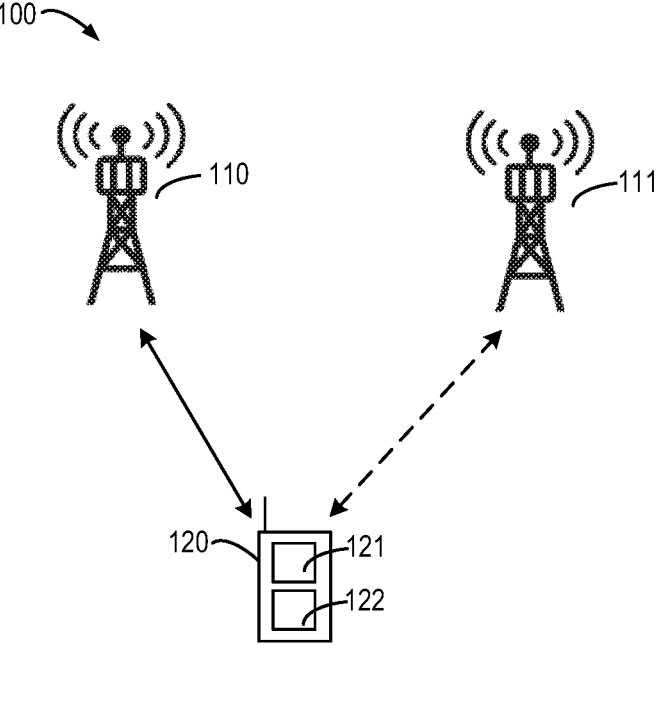
FIG. 1 illustrates an example communication scenario in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, currently, when the terminal device needs to perform data transmission in the second network, the terminal device just releases the connection with the first network without notifying the first network. In this case, the first network would consider the terminal device as connection failure, which lead to incorrect network performance recording.

Embodiments of the present disclosure provide a solution for notifying a switch from the first network to the second network so as to solve the above and other problems. The solution can avoid incorrect network performance recording and facilitate enhancement of the performance of the terminal device. Principles and implementations of the present disclosure will be described in detail below with reference to the figures.

FIG. 1 illustrates a schematic diagram of an example communication scenario 100 in which embodiments of the present disclosure can be implemented. As shown in FIG. 1, the communication scenario 100 may involve a network device 110 (also referred to as a first network device 110 hereafter) and a terminal device 120 carrying a first USIM card 121 and a second USIM card 122. The first network device 110 may serve at least one of the first and second USIM cards 121 and 122. The first and second USIM cards 121 and 122 may conform same or different RATs which are existing now or to be developed in the future. It should be noted that the number of the USIM cards carried by the terminal device 120 is not limited to two, and more than two USIM cards also can be applied. For convenience, the following description is given by taking two USIM cards as an example.

As shown in FIG. 1, the communication scenario 100 may further involve at least one neighboring network device 111 (also referred to as a second network device 111 hereafter). Here, only one second network device 111 is shown in FIG. 1 for concise. The neighboring network device 111 may also serve at least one of the first and second USIM cards 121 and 122. For convenience, unless otherwise stated, the following description is made under the assumption that the first network device 110 serves the first USIM card 121 and the second network device 111 serves the second USIM card 122. However, it should be noted that, it is merely an example for illustration, and does not make limitation for the present disclosure. For example, the first and second USIM cards 121 and 122 may be served by the same network device such as the first network device 110 or the second network device 111.

Further, the first network device 110 may communicate with the terminal device 120 via a channel such as a wireless communication channel. Similarly, the second network device 111 may also communicate with the terminal device 120 via a channel such as a wireless communication channel.

It is to be understood that the number of devices in FIG. 1 is given for the purpose of illustration without suggesting any limitations to the present disclosure. The communication scenario 100 may involve any suitable number of network devices and/or terminal devices adapted for implementing implementations of the present disclosure.

The communications in the communication scenario 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, the sixth generation (6G) communication protocols or beyond.

For convenience, the communication network formed between the first network device 110 and the terminal device 120 is called as a first network (also referred to as a first communication network below), and the communication network formed between the second network device 111 and the terminal device 120 is called as a second network (also referred to as a second communication network).

It should be noted that one terminal device may involve multiple networks in multiple communication network systems. In some embodiments, the multiple networks may be associated with multiple identities of the terminal device. It should be noted that the multiple networks may be associated with other aspects of the terminal device, and the present application does not make limitation for this. For illustration, the following description is given by taking a first network and a second network associated with first and second subscriber identity modules of a terminal device as an example.

As shown in FIG. 1, in case that the terminal device 120 has established a connection with the first network device 110 in the first network and stayed in idle or inactive state in the second network, if the terminal device 120 needs to perform data transmission with the second network device 111 in the second network, the terminal device 120 needs to perform a switch from the first network device 110 of the first network to the second network device 111 of the second network.

According to embodiments of the present application, if determining that a switch is to be performed from the first network device 110 to the second network device 111, the terminal device 120 transmits a request for the switch to the first network device 110. In this way, the switch can be notified to the network device and thus incorrect network performance recording can be avoided. More details will be described with reference to FIG. 2.

Figure 2:
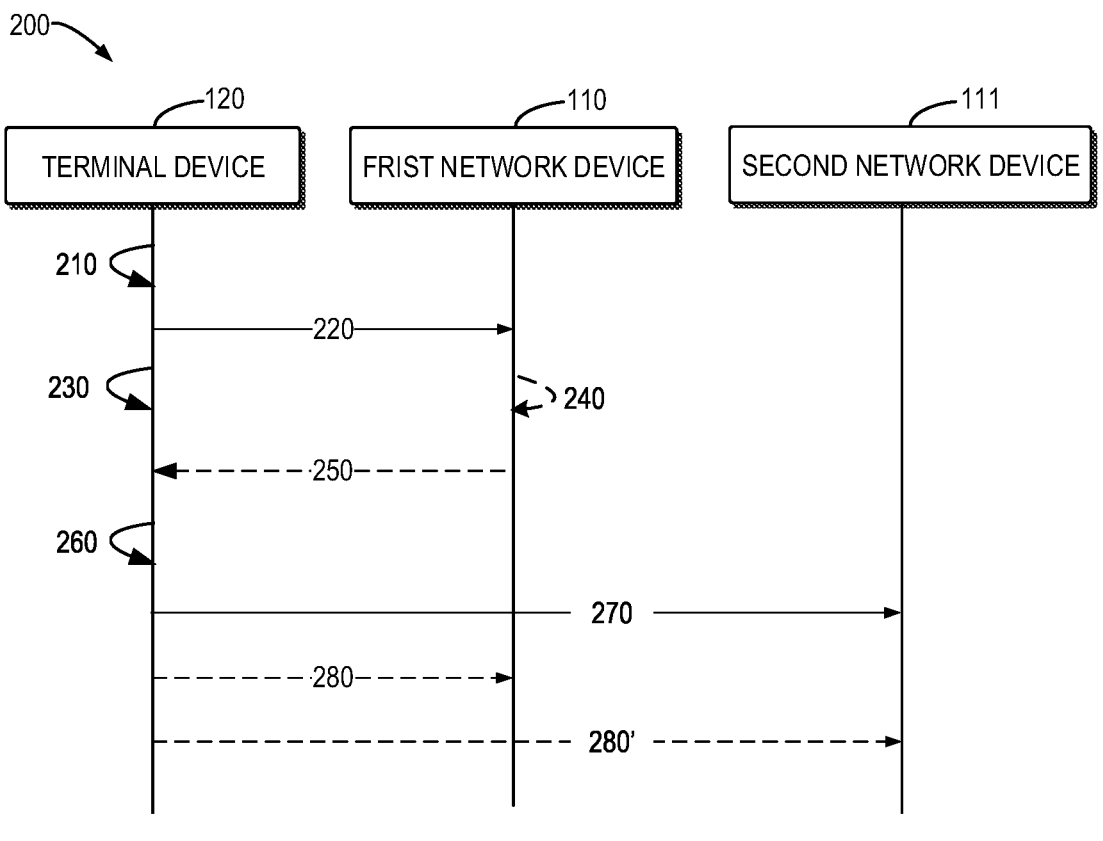
FIG. 2 illustrates a schematic diagram illustrating a process for communication during a switch from a first network to a second network according to some embodiments of the present disclosure.

FIG. 2 shows a schematic diagram illustrating a process 200 for communication during a switch from a first network to a second network according to embodiments of the present disclosure. For the purpose of discussion, the process 200 will be described with reference to FIG. 1. The process 200 may involve the terminal device 120, the first network device 110 and the second network device 111 as illustrated in FIG. 1. In this embodiment, the terminal device 120 is assumed to be in a connected state in the first network of the first network device 110, and in an idle or inactive state in the second network of the second network device 111.

As shown in FIG. 2, the terminal device 120 determines 210 whether a switch is to be performed from the first network device 110 to the second network device 111. In some embodiments, the terminal device 120 may determine whether data is to be transmitted between the terminal device 120 and the second network device 111, and if determining that the data is to be transmitted, the terminal device 120 may determine that whether there is ongoing emergency service in the first network. If determining that there is no ongoing emergency service in the first network, the terminal device 120 may determine that the switch is to be performed.

For example, if the terminal device 120 has mobile originate (MO) data to be transmitted to the second network device 111 and there is no ongoing emergency service in the first network, the terminal device 120 may determine that the switch is to be performed. Alternatively, if the terminal device 120 receives a paging message from the second network device 111 and there is no ongoing emergency service in the first network, the terminal device 120 may determine that the switch is to be performed. If determining there is ongoing emergency service in the first network, the terminal device 120 shall neglect the paging information to avoid interrupting the emergency service. In this way, the quality of the emergency service is assured.

Upon determining that the switch is to be performed, the terminal device 120 transmits 220 a request for the switch to the first network device 110. In some embodiments, the terminal device 120 may transmit the request via a radio resource control (RRC) message. For example, the terminal device 120 may transmit the request via UEAssistanceInformation message. It should be noted that any other existing or future developed RRC messages can also be used, and the present application does not make limitation for this.

In some embodiments, the request may comprise an expected RRC state in the first communication network. For example, the expected RRC state may include an idle, inactive or connected state. In some alternative or additional embodiments, the request may comprise a cause of the request. For example, the cause may include power saving for power saving case. As another example, the cause may include network switch for the switch to the second network case. It should be noted that any other suitable forms of the cause are also feasible. In this way, it is useful for the first network device 110 to differentiate the reason of releasing request.

In some embodiments in which the cause of the request includes the network switch, the request may comprise service information of the second communication network. In some embodiments, the service information may include expected switch period or pattern of absent. For example, the service information may include expected periodicity, time domain offset and absent time per cycle.

In some embodiments in which time-division multiplexing (TDM) pattern to be used is decided by the terminal device 120, the request may include a suggestion of a TDM pattern. In some embodiments, the request may include a list of candidate TDM patterns. In this case, the first network device 110 may select one from the list. In some embodiments, the suggestion of the TDM pattern may be transmitted in the request. For example, the terminal device 120 may transmit the suggestion of the TDM pattern in the request via UEAssistantInformation message. In some alternative embodiments, the suggestion of the TDM pattern may be transmitted separately from the request. For example, the terminal device 120 may transmit the suggestion of the TDM pattern via RRCSetupComplete message.

According to embodiments of the present application, the TDM pattern (also referred to as switch gap herein) is configured for the terminal device 120 to switch to the second network for a certain period, e.g., for a short period to transmit small data, while remaining connected state in the first network.

During off period of the TDM pattern, the first network device 110 should avoid scheduling the terminal device 120, and the medium access control (MAC) entity of the terminal device 120 shall, on all the Serving Cell(s) or specific Serving Cell(s) configured, not perform any uplink (UL) transmission except for Msg 3 and Msg A, not perform physical downlink control channel (PDCCH) monitoring and downlink (DL) reception except if the random access response (RAR) window, msgB response window or the Contention Resolution timer is running.

In some embodiments, the first network device 110 may broadcast whether it supports the TDM pattern in system information, and the terminal device 120 may determine, from the system information, whether the first network device 110 supports the TDM pattern. In accordance with a determination that the first network device 110 supports the TDM pattern, the terminal device 120 may determine a TDM pattern and incorporate the TDM pattern in the request for the switch.

In some embodiments, the TDM pattern information may comprise starting information and duration of the switch. This may be considered as one shot switch gap. In some embodiments, the starting information may include any of system frame number (SFN), time slot number, orthogonal frequency division multiplexing (OFDM) symbol number. In some alternative embodiments, the TDM pattern information may comprise a periodicity, a time domain offset and a length of absent time per cycle of the switch. This may be considered as periodical switch gap.

It should be noted that the request are not limited by the above examples, but also include any other suitable information associated with data transmission to be performed in the second communication network. In this way, it is useful for the first network device 110 to decide on a TDM pattern to be used.

In some embodiments in which the terminal device 120 is configured with dual connectivity (DC) and the terminal device 120 wants to remain connected state in the first network, the request may include a release or deactivation of at least part of serving cells while remaining a connected state in the first communication network. For example, the terminal device 120 may set the expected RRC state as a connected state, and indicate releasing or deactivating the entire secondary node (SN). Alternatively, the terminal device 120 may set the expected RRC state as a connected state, and indicate releasing or deactivating specific serving cell or serving cells of the SN. In some embodiments, the DC may be LTE-DC, LET-NR DC (EN-DC), next generation core NR-LTE DC (NG EN-DC), NR-LTE DC (NE-DC), or NR-DC.

In some embodiments in which the terminal device 120 is configured with carrier aggregation and the terminal device 120 want to remain connected state in the first network, the request may include a suggestion of the release or deactivation of at least part of serving cells while remaining a connected state in the first communication network. For example, the terminal device 120 may set the expected RRC state as a connected state, and indicate releasing or deactivating all the serving cells configured. Alternatively, the terminal device 120 may set the expected RRC state as a connected state, and indicate releasing or deactivating specific serving cell or serving cells.

According to embodiments of the present application, a timer for network switch is defined. Now referring to FIG. 2, in some embodiments, upon transmitting 220 the request, the terminal device 120 may start 230 the timer. In some embodiments, an upper value of the timer may be broadcasted by system information from the first network device 110. Alternatively, an upper value of the timer may be configured by a RRC message from the first network device 110. It should be noted that the upper value may also be determined in any other suitable forms.

In some embodiments, if determining that the timer is not running, the terminal device 120 may transmit the request for the switch. For example, in case that the switch has not been performed and the timer is running, even if determining that next data is to be performed between the terminal device 120 and the first network device 110, the terminal device 120 shall not transmit another request for the switch. In this way, repeat transmission of the request can be avoid, and transmission resource can be saved.

In some embodiments in which the first network device 110 ignores the request and does not give a response to the request, the terminal device 120 may autonomously perform 270 the switch to the second network device 111 at the expiration of the timer. In some embodiments for performing the switch, the terminal device 120 may release the connection with the first network device 110 so as to be in idle state in the first network, and switch to the second network. In some alternative embodiments, the terminal device 120 may keep the connection with the first network device 110, and use a TDM pattern to perform a switch between the first network device 110 and the second network device 111.

In some alternative embodiments, as shown in FIG. 2, upon receiving the request for the switch, the first network device 110 may determine 240 a response to the request and transmit 250 the response to the terminal device 120 within a time period corresponding to the upper value of the timer. Upon receiving the response to the request, the terminal device 120 may stop 260 the timer. In some embodiments, the response may be transmitted in RRCRelease message. Alternatively, the response may be transmitted in RRCReconfiguration message with switch gap configuration. It should be noted that the above is merely an example, and the response may be transmitted in any other suitable existing or future developed RRC message.

In some embodiments, the first network device 110 may transmit a response (also referred to as a first response below) indicating that the switch is rejected. In some embodiments, the response may include a wait time for which a further request for the switch is disabled to be transmitted by the terminal device 120. During the wait time, the first network device 110 expects keeping connection with the terminal device 120 and the terminal device 120 should not initiate another switch request within the wait time. In some alternative or additional embodiments, the response may include a cause of the rejection. For example, the cause may indicate that important service will be performed between the terminal device 120 and the first network device 110. It should be noted that the response may further include any other suitable contents. It should be also noted that the cause may include any other suitable contents.

In some alternative embodiments, the first network device 110 may transmit a response (also referred to as a second response below) indicating that the switch is allowed. In some embodiments in which the first network device 110 supports a TDM pattern, the response may include a TDM pattern to be used in a switch between the first and second network devices 110 and 111.

In some embodiments in which a TDM pattern is decided by the first network device 110, the first network device 110 may determine a TDM pattern based on service information of the second network device 111 and a suggestion of the TDM pattern if any received from the request, and incorporate the TDM pattern in the response to the request. In some embodiments in which a TDM pattern is decided by the terminal device 120, the first network device 110 may reject the suggestion of the TDM pattern by the terminal device 120, and provide a suggested TDM pattern in the second response.

For example, the first network device 110 may transmit, to the terminal device 120, a RRC message handling the request such as RRCRelease message and RRCReconfiguration message with switch gap configuration. Upon receiving the RRC message, the terminal device 120 may stop the timer. It should be noted that any other existing or future developed RRC messages can also be used, and the present application does not make limitation for this.

In some alternative embodiments, upon determining that a re-establishment of a connection is initiated with the first network device 110, the terminal device 120 may stop the timer. In some alternative embodiments, upon receiving a message of a handover from the first network device 110 to a third network device of the first communication network, the terminal device 120 may stop the timer. For example, upon receiving RRCReconfiguration message including reconfigurationWithSync, the terminal device 120 may stop the timer. In some embodiments in which the first network device 110 has switch gap configuration for the terminal device 120, the switch gap configuration can be passed from the first network device 110 as a source network device to the third network device as a target network device during a handover. For example, the switch gap configuration may be passed via HandoverPreparationInformation message. It should be noted that any other suitable messages are also feasible.

As stated above, upon receiving a response from the first network device 110 before an expiration of the timer, the terminal device 120 may stop 260 the timer. Then the terminal device 120 may perform 270 the switch to the second network device 111 according to the response to the request. In some embodiments, the terminal device 120 may release the connection with the first network device 110 so as to be in idle or inactive state in the first network, and switch to the second network. In some alternative embodiments, the terminal device 120 may keep the connection with the first network device 110, and use a TDM pattern to perform a switch between the first network device 110 and the second network device 111.

As shown in FIG. 2, in some embodiments in which the terminal device 120 want to stop the TDM pattern, the terminal device 120 may transmit 280 or 280' an indication for stopping the TDM pattern to the related network device. In some embodiments, if determining that no data is to be transmitted between the terminal device 120 and the second network device 111, the terminal device 120 may transmit 280 the indication to the first network device 110. In some alternative embodiments, if determining that no data is to be transmitted between the terminal device 120 and the first network device 110, the terminal device 120 may transmit 280' the indication to the second network device 111.

In some embodiments, the terminal device 120 may transmit the indication via a RRC message. In some embodiments, the terminal device 120 may transmit the indication in an implicit way. For example, the terminal device 120 may send a RRC message such as UEAssistanceInformation message with expected RRC state as connected state and without TDM pattern information. Alternatively, the terminal device 120 may transmit the indication in an explicit way. For example, the terminal device 120 may send a RRC message such as UEAssistanceInformation message with explicit indication, such as a bit value.

In some alternative embodiments, the terminal device 120 may transmit the indication via a media access control (MAC) control element (CE). In this way, the terminal device 120 can use the MAC CE to activate or deactivate the TDM pattern.

In some embodiments in which the terminal device 120 is not able to return to the first network by the end of the TDM pattern, the terminal device 120 may release the connection with the first network device 110, and perform the procedure of going to idle state. Alternatively, the terminal device 120 may take no action. That is, it is up to the terminal device 120 whether to keep the connection with the first network device 110.

It should be note that actions shown in FIG. 2 are not always necessary for implementing embodiments of the present disclosure, and more or less actions may be adapted as needed. Corresponding to the processes described in FIG. 2, embodiments of the present disclosure provide methods of communication implemented at a terminal device and at a network device. These methods will be described below with reference to FIGS. 3 to 10.

Figure 3:
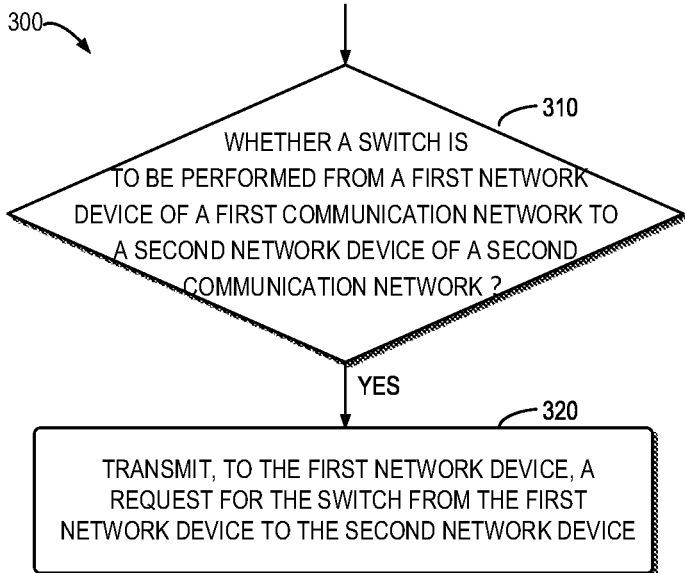
FIG. 3 illustrates an example method of communication implemented at a terminal device in accordance with some embodiments of the present disclosure.

FIG. 3 illustrates an example method 300 of communication implemented at a terminal device in accordance with some embodiments of the present disclosure. For example, the method 300 may be performed at the terminal device 120 as shown in FIG. 1. For the purpose of discussion, in the following, the method 300 will be described with reference to FIG. 1. It is to be understood that the method 300 may include additional blocks not shown and/or may omit some blocks as shown, and the scope of the present disclosure is not limited in this regard.

As shown in FIG. 3, at block 310, the terminal device 120 determines whether a switch is to be performed from the first network device 110 to the second network device 111. In some embodiments, the first network of the first network device 110 may be associated with a first identity (such as first USIM card 121) of the terminal device 120, and the second network of the second network device 111 may be associated with a second identity (such as second USIM card 122) of the terminal device 120. It should be noted that the first network and the second network may be differentiated from each other in other aspects of the terminal device 120 than in identities.

Upon determining that the switch is to be performed, at block 320, the terminal device 120 transmits, to the first network device 110, a request for the switch from the first network device 110 to the second network device 111. In this way, the switch is notified to the network side, and incorrect network performance recording can be avoided. Thus, enhancement of performance during the network switch can be provided.

According to some embodiments of the present application, a timer is introduced to regulate the terminal device 120's behavior for network switch. In some embodiments, the terminal device 120 may start the timer upon transmitting the request. In some embodiments in which data is determined to be transmitted to the second network device 111, the terminal device 120 may determine whether the timer is running, and transmit the request for the switch in accordance with a determination that the timer is not running. In this way, repeat transmission of a request for a switch can be effectively avoided.

In some embodiments, the terminal device 120 may perform the switch at expiration of the timer. In some embodiments, the terminal device 120 may stop the timer in response to at least one of the following: receiving a response to the request from the first network device 110; determining that a re-establishment of a connection is initiated with the first network device 110; or receiving a message of a handover from the first network device 110 to a third network device of the first network. More details will be described below with reference to FIGS. 4-7.

Figure 4:
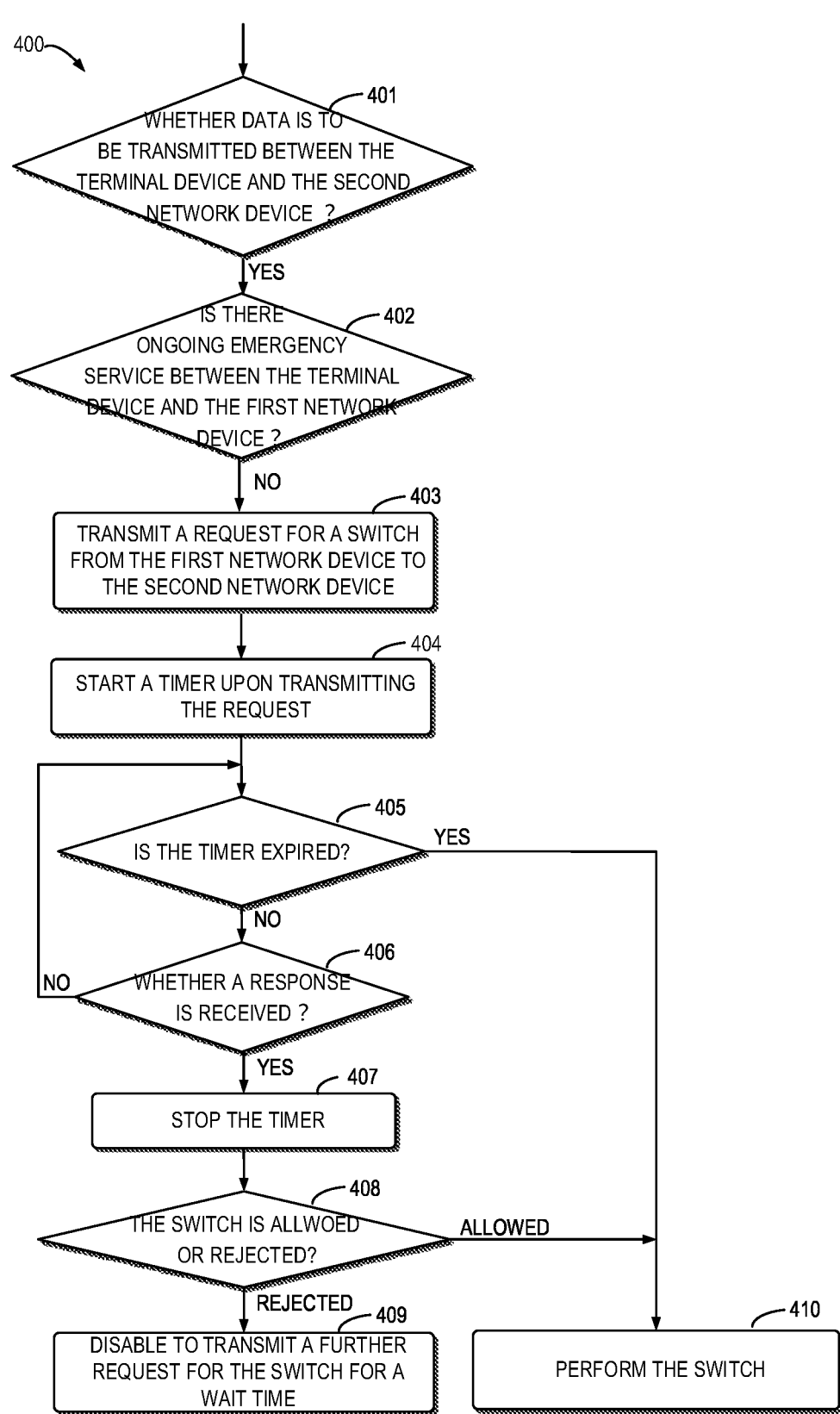
FIG. 4 illustrates another example method of communication implemented at a terminal device in accordance with some embodiments of the present disclosure.

FIG. 4 illustrates another example method 400 of communication implemented at a terminal device in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 120 may determine whether data is to be transmitted between the terminal device 120 and the second network device 111. In some embodiments, if there is MO data to be transmitted to the second network device 111, the terminal device 120 may determine that the data is to be transmitted. In some alternative embodiments, if receiving a paging message from the second network device 111, the terminal device 120 may determine that the data is to be transmitted.

Upon determining that the data is to be transmitted, at block 420, the terminal device 120 may determine whether there is ongoing emergency service between the terminal device 120 and the first network device 110. If determining that there is no ongoing emergency service between the terminal device 120 and the first network device 110, at block 403, the terminal device 120 may transmit, to the first network device 110, a request for a switch from the first network device 110 to the second network device 111. In this way, the quality of emergency service can be assured.

In some embodiments, the terminal device 120 may determine whether a timer for network switch is running, and if determining that the timer is running, the terminal device 120 does not transmit the request to the first network device 110, and if determining that the timer is not running, the terminal device 120 transmit the request to the first network device 110. In this way, unnecessary retransmission of the request can be avoided.

In some embodiments, the request may comprise at least one of the following: an expected RRC state in the first network; a cause of the request; service information of the second network; a suggestion of a TDM pattern; and a suggestion of the release or deactivation of at least part of serving cells while remaining a connected state in the first network. Other details of the request are similar with that described above in connection with action 220 in FIG. 2, and are not repeated here.

Upon transmitting the request, at block 404, the terminal device 120 may start a timer. In some embodiments, the terminal device 120 may receive an upper value of the timer in system information from the first network device 110. Alternatively, the terminal device 120 may receive the upper value of the timer in a dedicated RRC message from the first network device 110. Based on the upper value, the terminal device 120 can manage the timing of the timer.

At block 405, the terminal device 120 may determine whether the timer is expired. If determining that the timer is not expired, at block 406, the terminal device 120 may determine whether a response to the request is received from the first network device 110. If determining at block 406 that the response is received, the terminal device 120 may stop the timer at block 407.

At block 408, the terminal device 120 may determine whether the switch is allowed or rejected based on the response. If the response indicates that the switch is rejected (i.e., a first response), at block 409, the terminal device 120 may not enable to transmit a further request for the switch for a wait time. In some embodiments in which the wait time is configured by the first network device 110, the terminal device 120 may obtain the wait time from the response. It should be noted that the wait time may be determined in any other suitable way.

If the response indicates that the switch is allowed (i.e., a second response), at block 410, the terminal device 120 may perform the switch. If determining at block 406 that the response is not received, the terminal device 120 may return to block 405. If determining at block 405 that the timer is expired, the terminal device 120 may enter block 410 to perform the switch.

In some embodiments for performing the switch, the terminal device 120 may release a first connection with the first network device 110, and establish a second connection with the second network device 111. In this way, the terminal device 120 may be in an idle or inactive state in the first network, and in a connected state in the second network.

In some alternative embodiments, the terminal device 120 may carry out a TDM pattern between the first network and the second network. In this way, the terminal device 120 may perform expected data transmission in the second network while remaining a connected state in the first network. This will be described in detail with reference to FIGS. 5 and 6.

Figure 5:
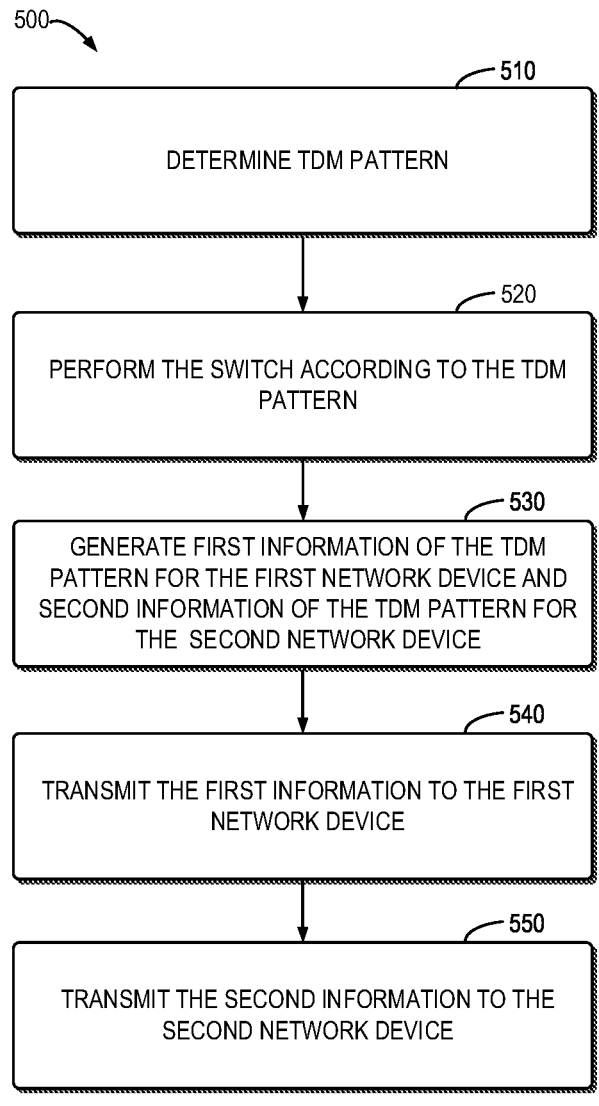
FIG. 5 illustrates another example method of communication implemented at a terminal device in accordance with some embodiments of the present disclosure.

FIG. 5 illustrates another example method 500 of communication implemented at a terminal device in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard. In this embodiment, the TDM pattern is decided by the terminal device 120.

As shown in FIG. 5, at block 510, the terminal device 120 may determine a TDM pattern associated with the switch. In some embodiments, the terminal device 120 may decide to use a TDM pattern based on knowledge of the support of the TDM pattern by the first network device 110. The knowledge may be obtained from system information broadcasted by the first network device 110. In some embodiments, the terminal device 120 may determine the TDM pattern by determining at least one of the following: starting information and duration of the switch (i.e. one shot switch gap); or a periodicity, a time domain offset and a length of absent time per cycle of the switch (i.e., periodical switch gap).

At block 520, the terminal device 120 may perform the switch according to the TDM pattern. In some embodiments, the terminal device 120 may perform data transmission in the first and second networks according to the TDM pattern between the first and second networks.

At block 530, the terminal device 120 may generate first information of the TDM pattern for the first network device 110 and second information of the TDM pattern for the second network device 111. In some embodiments, the first information and second information may be adapted to meet respective time-domain requirements in the first and second networks.

At block 540, the terminal device 120 may transmit the first information to the first network device 110. For example, the terminal device 120 may transmit the first information via UEAssistanceInformation message. It should be noted that any other suitable messages are also feasible.

At block 550, the terminal device 120 may transmit the second information to the second network device 111. For example, the terminal device 120 may transmit the second information via RRCSetupComplete message. It should be noted that any other suitable messages are also feasible.

In some alternative embodiments, the first network device 110 may re-negotiate with the terminal device 120 for the TDM pattern. In some embodiments, the terminal device 120 may provide a list of candidate TDM patterns for the first network device 110 to select one of them. In some embodiments, in case that the terminal device 120 provides a TDM pattern, the first network device 110 may reject it and provide a suggested TDM pattern to the terminal device 120.

So far, embodiments about the case that the TDM pattern is decided by the terminal device 120 is described with reference to FIG. 5. The following description will be made in connection with FIG. 6 on the case that the TDM pattern is decided by the first network device 110.

FIG. 6 illustrates another example method 600 of communication implemented at a terminal device in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

As shown in FIG. 6, at block 610, the terminal device 120 may receive, from the first network device 110, a TDM pattern associated with the switch. In some embodiments, the terminal device 120 may obtain the TDM pattern from a response to the request for the switch received from the first network device 110. In some embodiments, the terminal device 120 may obtain at least one of the following: starting information and duration of the switch (i.e. one shot switch gap); or a periodicity, a time domain offset and a length of absent time per cycle of the switch (i.e., periodical switch gap).

At block 620, the terminal device 120 may perform the switch according to the TDM pattern. In some embodiments, the terminal device 120 may perform data transmission in the first and second networks according to the TDM pattern between the first and second networks.

At block 630, the terminal device 120 may generate second information of the TDM pattern for the second network device 111 based on the received TDM pattern from the network device 110. In some embodiments, the second information may be adapted to meet time-domain requirements in the second network.

At block 640, the terminal device 120 may transmit the second information to the second network device 111. For example, the terminal device 120 may transmit the second information via RRCSetupComplete message. It should be noted that any other suitable messages are also feasible.

So far, the activation of the TDM pattern is described. The following description is made on the deactivation of the TDM pattern. FIG. 7 illustrates another example method 700 of communication implemented at a terminal device in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard. As shown in FIG. 7, at block 710, the terminal device 120 may determine whether no data is to be transmitted between the terminal device 120 and one of the first and the second network devices 110 and 111. Upon determining that no data is to be transmitted between the terminal device 120 and one of the first and the second network devices 110 and 111, at block 720, the terminal device 120 may transmit, to the other of the first and the second network devices 110 and 111, an indication for stopping the TDM pattern.

In some embodiments, if determining that no data is to be transmitted between the terminal device 120 and the second network device 111, the terminal device 120 may transmit the indication to the first network device 110. In some embodiments, if determining that no data is to be transmitted between the terminal device 120 and the first network device 110, the terminal device 120 may transmit the indication to the second network device 111.

In some embodiments, the terminal device 120 may transmit the indication via a RRC message. In some embodiments, the terminal device 120 may transmit the indication in an implicit way. For example, the terminal device 120 may send a RRC message such as UEAssistanceInformation message with expected RRC state as connected state and without TDM pattern information. Alternatively, the terminal device 120 may transmit the indication in an explicit way. For example, the terminal device 120 may send a RRC message such as UEAssistanceInformation message with explicit indication, such as a bit value.

In some alternative embodiments, the terminal device 120 may transmit the indication via a media access control (MAC) control element (CE). In this way, the terminal device 120 can use the MAC CE to activate or deactivate the TDM pattern.

At block 730, the terminal device 120 may stop the TDM pattern and keep connection with the other of the first and second network devices 110 and 111.

In some embodiments in which the terminal device 120 is not able to return to the first network by the end of the TDM pattern, the terminal device 120 may release the connection with the first network device 110, and perform the procedure of going to idle or inactive state. Alternatively, the terminal device 120 may take no action. That is, it is up to the terminal device 120 whether to keep the connection with the first network device 110.

So far, the method of communication implemented at a terminal device are described. Correspondingly, embodiments of the present application also provide a method of communication implemented at a network device. This will be described below with reference to FIGS. 8-10.

Figure 8:
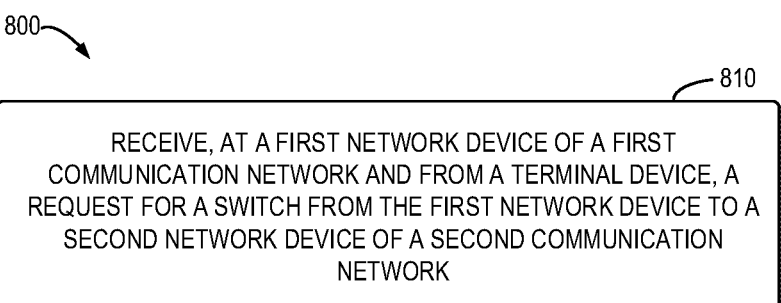
FIG. 8 illustrates an example method of communication implemented at a network device in accordance with some embodiments of the present disclosure.

FIG. 8 illustrates an example method 800 of communication implemented at a network device in accordance with some embodiments of the present disclosure. For example, the method 800 may be performed at the first network device 110 or the second network device 111 as shown in FIG. 1. For the purpose of discussion, in the following, the method 800 will be described with reference to the first network device 110 FIG. 1. It is to be understood that the method 800 may include additional blocks not shown and/or may omit some blocks as shown, and the scope of the present disclosure is not limited in this regard.

As shown in FIG. 8, at block 810, the first network device 110 receives, from the terminal device 120, a request for a switch from the first network device 110 to the second network device 111. In some embodiments, the first network of the first network device 110 may be associated with a first identity (such as first USIM card 121) of the terminal device 120, and the second network of the second network device 111 may be associated with a second identity (such as second USIM card 122) of the terminal device 120. It should be noted that the first network and the second network may be differentiated from each other in other aspects of the terminal device 120 than in identities.

In some embodiments, the request may comprise at least one of the following: an expected RRC state in the first network; a cause of the request; service information of the second network; a suggestion of a TDM pattern; and a suggestion of the release or deactivation of at least part of serving cells while remaining a connected state in the first network.

In some embodiments, the first network device 110 may provide no response to the request. In some alternative embodiments, the first network device 110 may transmit a response to the request within a time period. In some embodiments, the time period may correspond to an upper value of a timer which is managed by the terminal device 120 and is started upon transmission of the request. In some embodiments, the first network device 110 may configure and transmit the upper value to the terminal device 120. For example, the upper value may be broadcasted in system information. Alternatively, the upper value may be configured in a RRC message.

In some embodiments, the first network device 110 may transmit a first response indicating that the switch is rejected. In some embodiments, the first response may comprise a wait time for which a further request for the switch is disabled to be transmitted. In this way, repeated transmission of the request for the switch can be avoided, and transmission resource can be saved.

In some embodiments, the first network device 110 may transmit a second response indicating that the switch is allowed. In some embodiments, the second response may comprise a TDM pattern associated with the switch. In this way, repeated transmission of the request for the switch can be avoided, and transmission resource can be saved. More details will be described below with reference to FIGS. 9-10.

Figure 9:
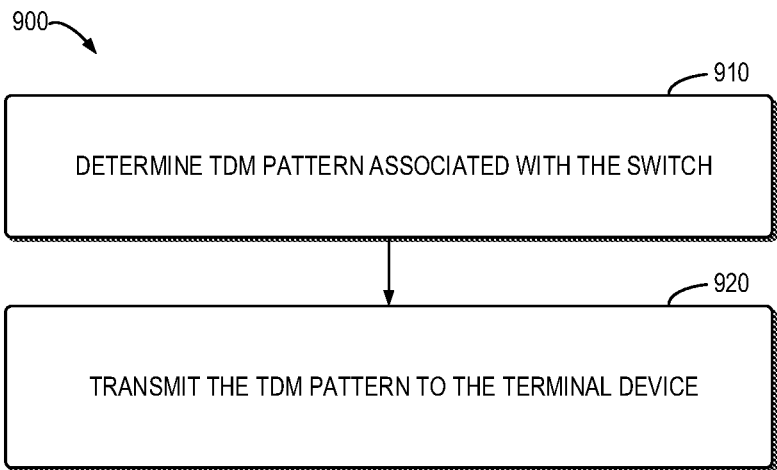
FIG. 9 illustrates another example method of communication implemented at a network device in accordance with some embodiments of the present disclosure.

FIG. 9 illustrates another example method 900 of communication implemented at a network device in accordance with some embodiments of the present disclosure. For example, the method 900 may be performed at the first network device 110 or the second network device 111 as shown in FIG. 1. For the purpose of discussion, in the following, the method 900 will be described with reference to the first network device 110 FIG. 1. It is to be understood that the method 900 may include additional blocks not shown and/or may omit some blocks as shown, and the scope of the present disclosure is not limited in this regard. In this embodiment, the TDM pattern is decided by the first network device 110.

As shown in FIG. 9, at block 910, the first network device 110 may determine a TDM pattern associated with the switch. In some embodiments, the first network device 110 may obtain the service information of the second network from the received request, and determine the TDM pattern based on the service information. In some embodiments in which the request includes a suggestion of the TDM pattern, the first network device 110 may obtain the service information and the suggestion of the TDM pattern from the received request, and determine the TDM pattern based on the service information and the suggestion of the TDM pattern.

In some embodiments, the first network device 110 may determine the TDM pattern by determining at least one of the following: starting information and duration of the switch; or a periodicity, a time domain offset and a length of absent time per cycle of the switch.

At block 920, the first network device 110 may transmit the TDM pattern to the terminal device 120. In some embodiments, the first network device 110 may transmit the TDM pattern in the second response to the terminal device 120. Alternatively, the first network device 110 may transmit the TDM pattern separately from the second response. In some embodiments, the TDM pattern may be transmitted in a RRC message such as RRCReconfiguration message. It should be noted that any other suitable RRC messages are also feasible.

Figure 10:
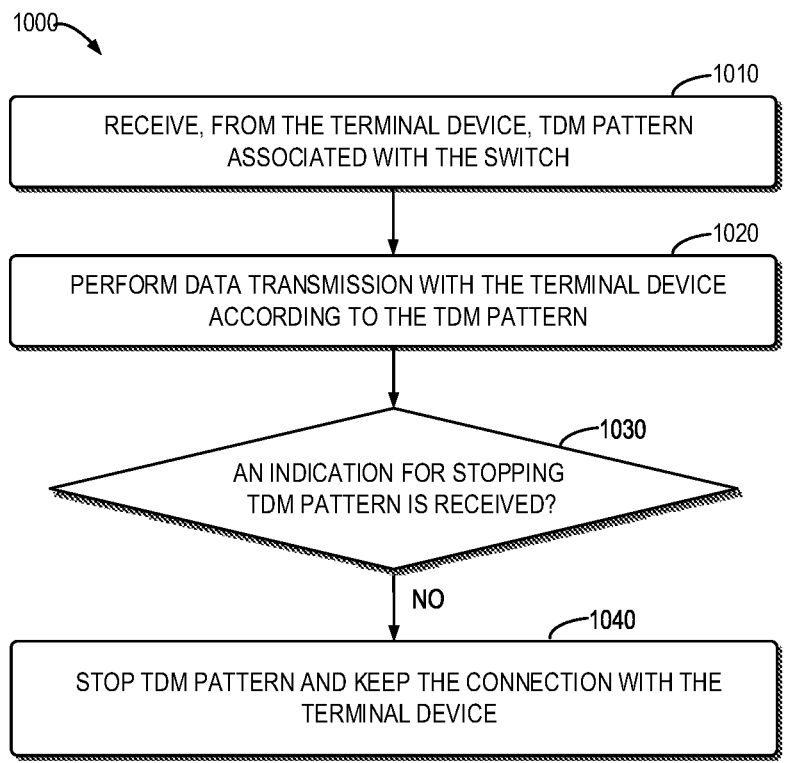
FIG. 10 illustrates another example method of communication implemented at a network device in accordance with some embodiments of the present disclosure.

Embodiments about the case that the TDM pattern is decided by the first network device 110 are described above. The following description will be given on the case that TDM pattern is decided by the terminal device 120. FIG. 10 illustrates another example method 1000 of communication implemented at a network device in accordance with some embodiments of the present disclosure. For example, the method 1000 may be performed at the first network device 110 or the second network device 111 as shown in FIG. 1. For the purpose of discussion, in the following, the method 1000 will be described with reference to the first network device 110 FIG. 1. It is to be understood that the method 1000 may include additional blocks not shown and/or may omit some blocks as shown, and the scope of the present disclosure is not limited in this regard.

As shown in FIG. 10, at block 1010, the first network device 110 may receive, from the terminal device 120, a TDM pattern associated with the switch. In some embodiments, the first network device 110 may receive at least one of the following: starting information and duration of the switch; or a periodicity, a time domain offset and a length of absent time per cycle of the switch. At block 1020, the first network device 110 may perform data transmission with the terminal device 120 according to the TDM pattern between the first network and the second network.

During the TDM pattern, the first network device 110 may receive, from the terminal device 120, an indication for stopping the TDM pattern. In this case, the first network device 110 may enter block 1030. At block 1030, the first network device 110 may determine whether an indication for stopping the TDM pattern is received.

In some embodiments, the first network device 110 may receive the indication via a RRC message. In some embodiments, the first network device 110 may receive the indication in an implicit way. For example, if receiving a RRC message such as UEAssistanceInformation message with expected RRC state as connected state and without TDM pattern information, the first network device 110 may determine that the indication for stopping the TDM pattern is received. In some alternative embodiments, the terminal device 120 may receive the indication in an explicit way. For example, if receiving a RRC message such as UEAssistanceInformation message with explicit indication, such as a bit value indicating that the TDM pattern should be stopped, the first network device 110 may determine that the indication for stopping the TDM pattern is received.

In some alternative embodiments, the first network device 110 may receive the indication via a MAC CE. For example, if receiving a MAC CE indicating that the TDM pattern should be stopped, the first network device 110 may determine that the indication for stopping the TDM pattern is received.

Upon determining that the indication is received, at block 1040, the first network device 110 may stop the TDM pattern and keep the connection with the terminal device 120.

The implementations of the methods described in FIGS. 3-10 substantially correspond to the process described in connection with FIG. 2, and thus other details are not repeated here. With the methods 300-1000 according to embodiments of the present disclosure, network performance during a network switch can be enhanced.

Figure 11:
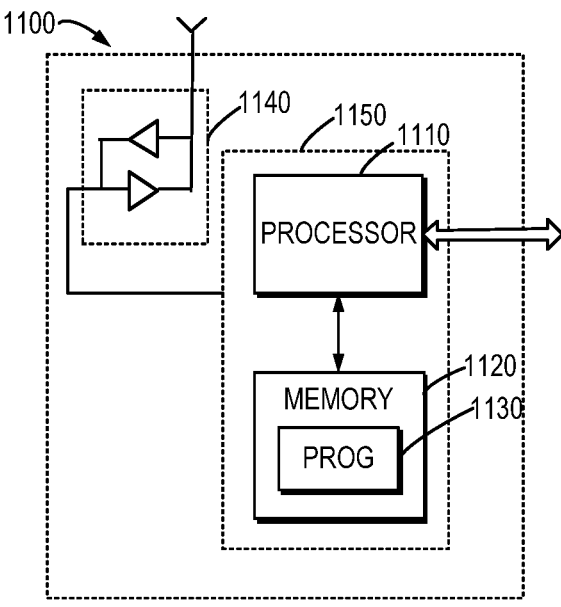
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the terminal device 120 or the first network device 110 or the second network device 111 as shown in FIG. 1. Accordingly, the device 1100 can be implemented at or as at least a part of the terminal device 120 or the first network device 110 or the second network device 111.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 1 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 1 to 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
    determining to switch from a first network to a second network, the first network and the second network being associated with respective Universal Subscriber Identity Modules (USIMs);
    transmitting to the first network, via first UEAssistanceInformation:
        first information indicating a preference for gaps,
        wherein the first information indicates a first gap pattern for the terminal device to switch to the second network while remaining in a connected state in the first network; and
    transmitting second UEAssistanceInformation to the first network, without including information indicating a gap pattern, based on a determination that the terminal device no longer has the preference for gaps.

2. The method of claim 1, the method further comprising:
    starting a first timer upon transmitting the first information.

3. The method of claim 2, further comprising:
    receiving, from the first network, a value of the first timer in a Radio Resource Control (RRC) message.

4. The method of claim 1, the method further comprising:
    receiving second information from the first network,
    wherein the second information indicates a second gap pattern for multi-USIM, determined by the first network based on the first information.

5. The method of claim 4, wherein the second information indicates:
    a starting System Frame Number (SFN) and a length of a gap, in a case where the gap is aperiodic; or
    a periodicity, a time domain offset, and a length of a gap, in a case where the gap is periodic.

6. The method of claim 1, wherein the first information indicates:
    a starting System Frame Number (SFN) and a length of a gap, in a case where the gap is aperiodic; or
    a periodicity, a time domain offset, and a length of a gap, in a case where the gap is periodic.

7. The method of claim 1, wherein the first UEAssistanceInformation further indicates one or more serving cells, or cells belonging to a secondary node that are to be released for multi USIM.

8. A method of communication performed by a first network device of a first network, the method comprising:
    upon a terminal device determining to switch from the first network to a second network, the first network and the second network being associated with respective Universal Subscriber Identity Modules (USIMs), receiving from the terminal device, via first UEAssistanceInformation:
        first information indicating a preference for gaps,
        wherein the first information indicates a first gap pattern for the terminal device to switch to the second network while remaining in a connected state in the first network; and
    receiving second UEAssistanceInformation from the terminal device,
    wherein the second UEAssistanceInformation is transmitted without including information indicating a gap pattern, based on a determination that the terminal device no longer has the preference for gaps.

9. The method of claim 8, the method further comprising:
    transmitting, to the terminal device, a value of a first timer in a RRC message,
    wherein the first timer is started upon the terminal device transmitting the first information.

10. The method of claim 8, the method further comprising:
    transmitting second information to the terminal device,
    wherein the second information configures the terminal device with a gap pattern.

11. The method of claim 8, wherein the method further comprises transmitting second information to the terminal device, and
    wherein the second information indicates:
        a starting System Frame Number (SFN) and a length of a gap, in a case where the gap is aperiodic; or
        a periodicity, a time domain offset, and a length of a gap, in a case where the gap is periodic.

12. The method of claim 8, wherein the preference for the gaps indicates:
    a starting System Frame Number (SFN) and a length of a gap, in a case where the gap is aperiodic; or
    a periodicity, a time domain offset, and a length of a pap, in a case where the gap is periodic.

* * * * *